US008688054B2

(12) United States Patent  
Pietraski et al.

(10) Patent No.: US 8,688,054 B2  
(45) Date of Patent: Apr. 1, 2014

(54) WIRELESS COMMUNICATION METHOD AND APPARATUS FOR ADAPTIVELY BIASING CHANNEL QUALITY INDICATORS TO MAINTAIN A DESIRED BLOCK ERROR RATE

(75) Inventors: Philip J. Pietraski, Huntington Station, NY (US); Gregory S. Sternberg, Great Neck, NY (US); Douglas R. Castor, Norristown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 285 days.

(21) Appl. No.: 12/275,743

(22) Filed: Nov. 21, 2008

(65) Prior Publication Data  
US 2009/0075598 A1 Mar. 19, 2009

Related U.S. Application Data

(63) Continuation of application No. 10/981,248, filed on Nov. 4, 2004, now Pat. No. 7,492,722.

(51) Int. Cl.  
*H04B 17/00* (2006.01)  
*H04B 7/00* (2006.01)  
*H04W 72/00* (2009.01)

(52) U.S. Cl.  
USPC .... 455/67.13; 455/69; 455/452.1; 455/277.2; 455/226.3; 370/235; 370/328; 370/332

(58) Field of Classification Search  
None  
See application file for complete search history.

(56) References Cited

U.S. PATENT DOCUMENTS

| 5,960,029 | A | 9/1999 | Kim et al. |
| 6,539,205 | B1 | 3/2003 | Wan et al. |
| 7,359,327 | B2 * | 4/2008 | Oshiba .......................... 370/235 |
| 2002/0097686 | A1 | 7/2002 | Qiu |
| 2002/0147953 | A1 | 10/2002 | Catreux et al. |
| 2003/0072280 | A1 | 4/2003 | McFarland et al. |

(Continued)

FOREIGN PATENT DOCUMENTS

| EP | 1289181 | 3/2003 |
| EP | 1341318 | 9/2003 |

(Continued)

OTHER PUBLICATIONS

Wiscom Technologies, "Performance of AMCS and HARQ for HSDPA in the non-ideal measurement feedback situations," TSG-RAN Working Group 1 Meeting #18, TSGR1#18(01)0050 (Jan. 15-19, 2001).

(Continued)

*Primary Examiner* — Yuwen Pan  
*Assistant Examiner* — Fanghwa Wang  
(74) *Attorney, Agent, or Firm* — Volpe and Koenig, P.C.

(57) ABSTRACT

A method and apparatus for adaptively biasing a channel quality indicator (CQI) used for setting a configuration of communication between a transmitter and a receiver in a wireless communication system. The receiver sends a CQI and positive acknowledgement (ACK)/negative acknowledgement (NACK) messages to the transmitter. The ACK/NACK messages indicate the absence or presence of error, respectively, in a transmitted data packet. The CQI is derived from the signal-to-interference ratio (SIR) and the ACK/NACK messages. The transmitter calculates the block error rate (BLER) of the transmitted data packets based upon the ACK/NACK messages sent from the receiver. The transmitter compares the BLER of the transmitted data packets to a target BLER and biases the CQI based on the comparison in order to achieve the target BLER.

10 Claims, 5 Drawing Sheets

(56) References Cited

U.S. PATENT DOCUMENTS

| | | |
|---|---|---|
| 2003/0100269 A1 | 5/2003 | Lehtinen et al. |
| 2003/0108013 A1* | 6/2003 | Hwang et al. .................. 370/335 |
| 2003/0114127 A1 | 6/2003 | Baldwin |
| 2003/0123396 A1 | 7/2003 | Seo et al. |
| 2003/0142649 A1 | 7/2003 | Taniguchi |
| 2003/0148770 A1 | 8/2003 | Das et al. |
| 2003/0232622 A1 | 12/2003 | Seo et al. |
| 2004/0100911 A1* | 5/2004 | Kwan et al. ................... 370/252 |
| 2004/0110473 A1* | 6/2004 | Rudolf et al. ................... 455/69 |
| 2004/0179493 A1 | 9/2004 | Khan |
| 2004/0203460 A1 | 10/2004 | Hasegawa |
| 2004/0203463 A1 | 10/2004 | Chen et al. |
| 2004/0219883 A1 | 11/2004 | Pauli et al. |
| 2004/0223507 A1 | 11/2004 | Kuchibhotla et al. |
| 2005/0003782 A1 | 1/2005 | Wintzell |
| 2005/0008103 A1 | 1/2005 | Sternberg et al. |
| 2005/0025254 A1 | 2/2005 | Awad et al. |
| 2005/0041622 A1 | 2/2005 | Dubuc et al. |
| 2005/0094596 A1 | 5/2005 | Pietraski et al. |
| 2005/0100038 A1 | 5/2005 | Pietraski et al. |
| 2005/0282500 A1 | 12/2005 | Wang et al. |
| 2006/0072508 A1* | 4/2006 | Zou et al. ....................... 370/332 |
| 2006/0165091 A1 | 7/2006 | Arima et al. |
| 2006/0171478 A1 | 8/2006 | Schotten et al. |
| 2007/0026803 A1 | 2/2007 | Malm |

FOREIGN PATENT DOCUMENTS

| | | |
|---|---|---|
| JP | 2001-333051 | 11/2001 |
| JP | 2002-124917 | 4/2002 |
| JP | 2004-186969 | 7/2004 |
| WO | 01/82521 | 11/2001 |
| WO | 02/45274 | 6/2002 |
| WO | 03/019820 | 3/2003 |
| WO | 2004/042982 | 5/2004 |
| WO | 2004/051872 | 6/2004 |
| WO | 2004/112288 | 12/2004 |
| WO | 2005/006568 | 1/2005 |

OTHER PUBLICATIONS

Aniba et al., "Adaptive Proportional Fairness for Packet Scheduling in HSDPA," IEEE Global Telecommunications Conference, vol. 6, Issue 29, pp. 4033-4037 (2004).

Hu et al., "Adaptive Modulation Using Long Range Prediction for Flat Rayleigh Fading Channels," IEEE International Symposium on Information Theory, p. 159 (Jun. 2000).

Nec et al., "Selection of MCS levels in HSDPA," TSG-RAN Working Group 1 Meeting #20, TSG R1-01-0589 (May 21-25, 2001).

Wiscom Technologies, "Performance of AMCS and HARQ for HSDPA in the non-ideal measurement and feedback situations," TSG-RAN Working Group 1 Meeting #18, TSGR1#18(01)0050 (Jan. 15-19, 2001).

Willis, "Proportional-Integral-Derivative Control", Department of Chemical and Process Engineering, University of Newcastle, Written on Nov. 17, 1998, Updated on Oct. 6, 1999.

* cited by examiner

WIRELESS COMMUNICATION METHOD AND APPARATUS FOR ADAPTIVELY BIASING CHANNEL QUALITY INDICATORS TO MAINTAIN A DESIRED BLOCK ERROR RATE

CROSS REFERENCE TO RELATED APPLICATION

This application is a continuation of U.S. patent application Ser. No. 10/981,248 filed Nov. 4, 2004 now U.S. Pat. No. 7,492,722, which is incorporated by reference as if fully set forth herein.

FIELD OF INVENTION

The present invention relates to a wireless communication system. More particularly, the invention relates to adaptively biasing Channel Quality Indicators (CQIs) in a wireless communication system including a base station and a Wireless Transmit/Receive Unit (WTRU).

BACKGROUND

Adaptive Coding and Modulation (ACM) is an effective technique for providing link adaptation in both Uplink (UL) and Downlink (DL) communications. ACM is typically accomplished by algorithms working together in both the receiver and the transmitter of a WTRU and/or a base station. The receiver makes an estimate of the channel quality by measuring the Signal-To-Interference Ratio (SIR) of one or more transmissions from the transmitter.

Each CQI may correspond to a particular configuration of radio resources such as code rate and modulation type. After each SIR measurement is made, the CQI is computed. For example, the SIR may be compared to a table of SIR-CQI pairs and the CQI value that yields the best performance, for example in terms of Block Error Rate (BLER) or throughput, is selected. This is typically performed at the receiver and sent back to the transmitter. The transmitter then selects a radio configuration that is no more aggressive than that indicated by the received CQI value. In an otherwise unpopulated cell, the transmitter would simply use a configuration consistent with a channel quality indicated by the CQI.

Although maintaining the appropriate link adaptation parameters, (e.g. code rate, modulation type, number of codes and power control), is known to optimize throughput for the radio link, there are cases where the parameters selected by the transmitter will be out-of-sync with channel quality. In essence, the parameter selected by the transmitter will not correspond to the CQI judged to optimize the throughput. This case can arise when for example there is insufficient data available for the next transmitted packet, the scheduler decides to share resources that would otherwise be required, or during conformance testing.

Another problem is that channel quality estimates may be more heavily quantized than the available set of radio resources, thus the assumed one-to-one mapping between CQI and radio resource configuration is lost. This is particularly true in Third Generation Partnership Project (3GPP) system.

The problem can be illustrated by considering the behavior of an adaptive bias algorithm when the transmitter occasionally uses more conservative configurations than indicated by the CQI report from the receiver. When the more conservative configurations are used, errors will be less frequent and the adaptive algorithm will adapt to request more aggressive configuration of resources to maintain the target BLER. When the transmitter returns to normal operation, responding as anticipated to CQI reports, the bias will have been adapted to the wrong value and many packets will be lost until reconvergence of the algorithm.

SUMMARY

The present invention is related to a wireless communication method and apparatus for adaptively biasing a CQI used for setting a configuration of communication between a transmitter and a receiver in a wireless communication system. The apparatus may be a wireless communication system including a receiver and a transmitter, a WTRU, a base station and/or an integrated circuit (IC).

In the wireless communication system, the receiver sends a CQI and a positive Acknowledgement (ACK)/Negative Acknowledgement (NACK) to the transmitter. The ACK/NACK messages indicate the absence or presence of error, respectively, in a transmitted data packet. The CQI is derived from the SIR and the ACK/NACK messages. The transmitter calculates the BLER of the transmitted data packets based upon the ACK/NACK messages sent from the receiver. The transmitter compares the BLER of the transmitted data packets to a target BLER and biases the CQI based on the comparison in order to achieve the target BLER.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a User Equipment (UE), mobile station, fixed or mobile subscriber unit, pager, or any other type of device capable of operating in a wireless environment.

When referred to hereafter, the terminology "base station" includes but is not limited to a Node-B, a site controller, an access point or any other type of interfacing device in a wireless environment.

The present invention is generally applicable to all modes of the 3GPP standards including Time Division Duplex (TDD), Frequency Division Duplex (FDD), Time Division Synchronous Code Division Multiple Access (TDSCDMA) and Code Division Multiple Access 2000 (CDMA 2000) scenarios, but may be applicable to other scenarios as well.

The features of the present invention may be incorporated into an IC or be configured in a circuit comprising a multitude of interconnecting components.

Figure 1:
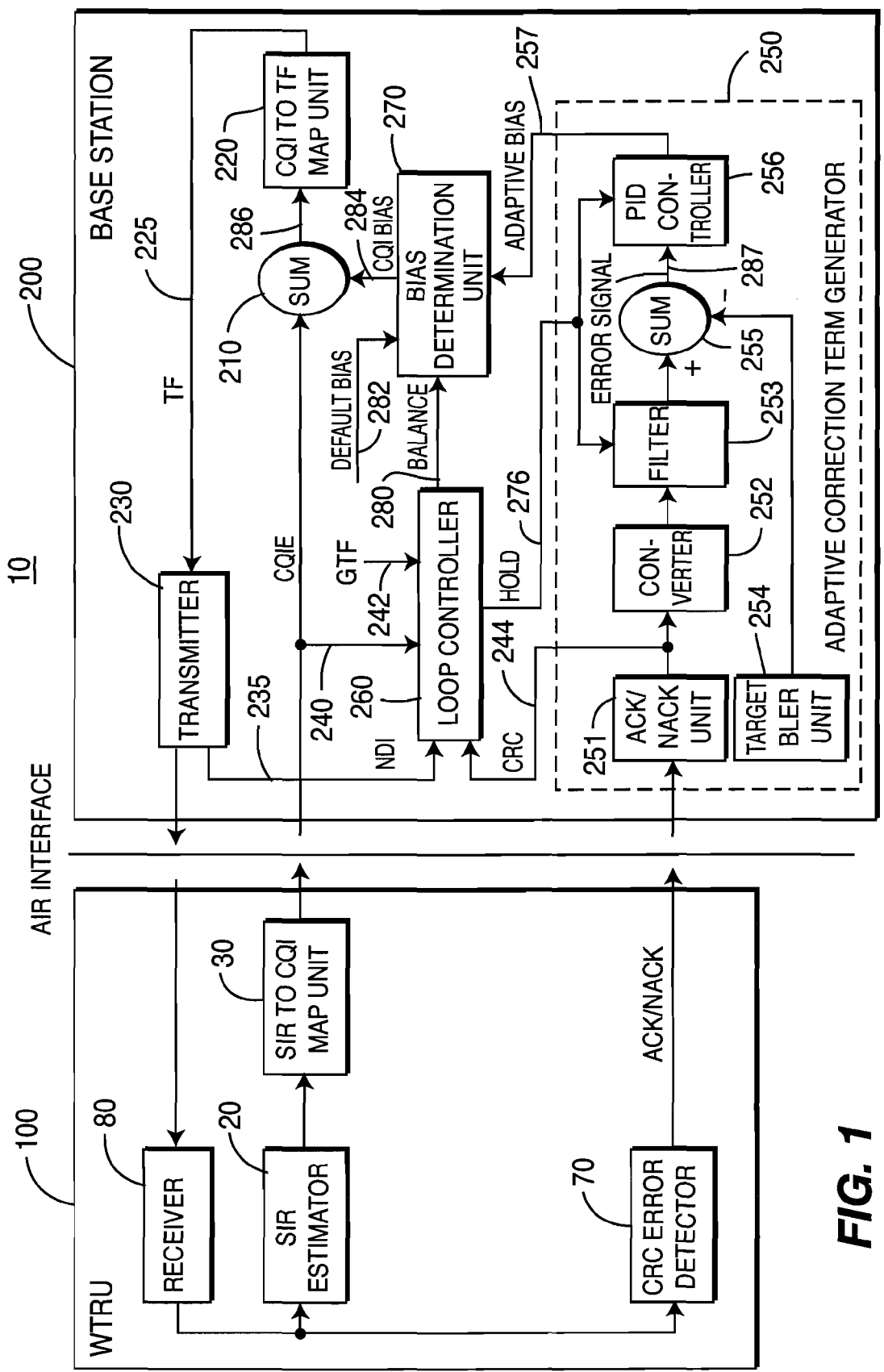
FIG. 1 is a block diagram of a wireless communication system including a WTRU and a base station for performing adaptive CQI biasing according to the present invention.

FIG. 1 is a block diagram of a wireless communication system 10 for performing adaptive CQI biasing according to the present invention. The system 10 performs adaptive CQI biasing of communication between a base station 200 and a WTRU 100. The invention will be described with reference to a base station 200 performing the CQI biasing, but it should be understood by those of skill in the art that it may also be performed at the WTRU.

Referring to FIG. 1, the WTRU 100 comprises SIR estimator 20, SIR to CQI map unit 30, Cyclic Redundancy Check (CRC) error detector 70 and a receiver 80. A data packet is received and processed by the receiver 80. The SIR estimator 20 estimates a SIR for a reference channel based on the received data packet. The calculated SIR is mapped by the SIR to CQI map unit 30 to generate a CQI value. The generated CQI value is chosen to yield the best performance, such as in terms of BLER or throughput based upon the fixed SIR to CQI pair table. The CRC error detector 70 detects any errors in a received data packet using CRC, and generates an ACK or NACK signal as appropriate according to the absence or presence of errors. An ACK indicates the absence of an error and a NACK indicates the presence of an error in the data packet.

Still referring to FIG. 1, the base station 200 comprises a summer 210, a CQI to Transport Format (TF) map unit 220, a transmitter 230, an adaptive correction term generator 250, a loop controller 260, and a bias determination unit 270.

The adaptive correction term generator 250 includes an ACK/NACK unit 251, a converter 252, a filter 253, a target BLER unit 254, a summer 255, and a Proportional Integral Derivative (PID) controller 256.

The occurrence of an error in the data packet sent to the receiver 80 in the WTRU 100 is identified by the ACK/NACK unit 251 based upon the ACK/NACK messages sent from the WTRU 100. The converter 252 maps the ACK/NACK messages, (resulting from the computation of the CRC into '0s' and '1s' respectively), and calculates the BLER of the current channel. This signal is preferably filtered by the filter 253. It should, however, be understood that the filter 253 is not required. The bandwidth of the filter 253 provides a mechanism to trade off between responsiveness of the bias term and the smoothness of the bias term. A simple Infinite Impulse Response (IIR) filter with a slowly decaying exponential impulse response can be used, but other filters may also be used.

The target BLER unit 254 generates a target BLER to achieve the desired performance, such as maximizing throughput. Because the CQI value alone cannot ensure the desired performance, a target BLER value is used as a reference in order to maximize data throughput. The purpose of maintaining a BLER that is close to the target BLER is that it optimizes the utilization of radio resources and therefore the data throughput of the system. The target BLER value may be a static setting or an operator-determined semi-static setting, (i.e., it may vary but is not expected to change rapidly).

The target BLER may be adjusted to optimize system throughput based on a variety of criteria. For example, target BLER will generally be set higher for vehicular speed channels such that the hybrid automatic repeat request (HARQ) combining may achieve retransmission time diversity gains. Vehicular speed estimation may be performed either at the WTRU 100 or the base station 200, although the estimate performed by the WTRU 100 will generally be more accurate. The target BLER may be set based on the output from the channel-type correction term generator 40. These gains may be larger than the loss due to more aggressive first transmission TFs.

The BLER as filtered by the filter 253 is compared with the target BLER value by the summer 255 to generate an error signal 287 that represents a deviation of current performance of the WTRU 100 from the target performance of the WTRU 100 in terms of BLER.

The PID controller 256 generates the adaptive bias signal 257. The PID controller 256 may also contain higher order linear or non-linear elements. It should be noted that a Proportional (P) controller, or a Proportional Integral (PI) or Integral (I) controller, may be used instead of the PID controller 256.

The adaptive bias signal 257 generated by the PID controller 256, and a balance value signal 280 generated by the loop controller 260, are input to the bias determination unit 270. The bias determination unit 270 outputs a CQI bias signal 284 to the summer 210. The bias determination unit 270 provides a means to use one or more default bias terms 282, (e.g., one or more factory or operator set/tuned parameters), in the event that the CQI values transmitted to the base station 200 are not being used as expected. The summer 210 provides a biased CQI value 286 to achieve the target BLER, based upon the adaptive bias signal 257.

The biased CQI value 286 is converted to a Transport Format (TF) 225 by the CQI to TF map unit 220. The TF 225 is a value of a radio resource configuration and includes a block size, a modulation type, a coding rate, and a transmission power. The transmitter 230 then transmits data packets to the WTRU 100 in accordance with the TF 225. The transmitter 230 also provides a New Data Indicator (NDI) 235 to the loop controller 260. The NDI is a flag set by the base station 200 and conveyed to the WTRU 100 via a High Speed Synchronization Control Channel (HS-SCCH).

Figure 2:
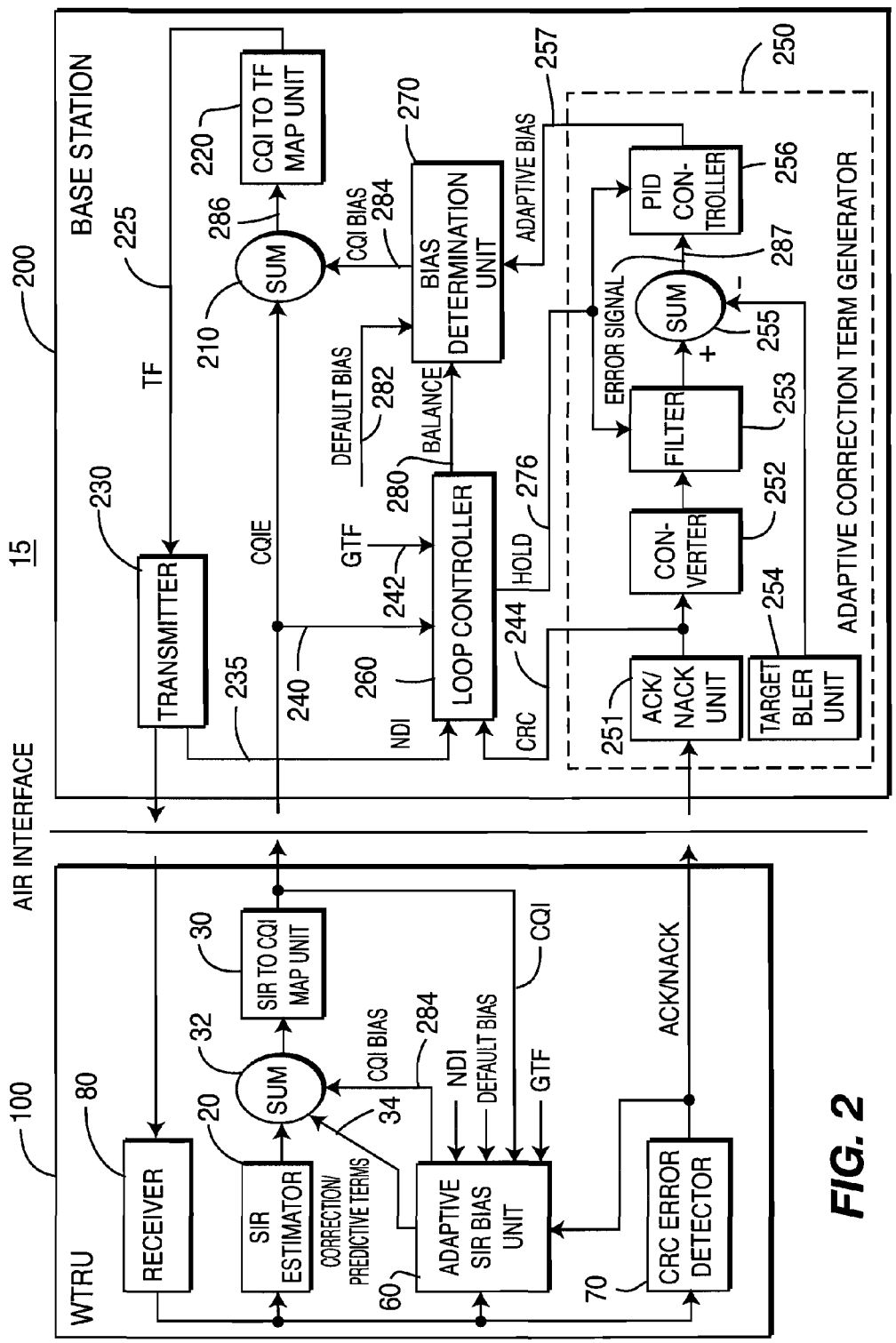
FIG. 2 is a block diagram of a wireless communication system wherein the WTRU includes an adaptive SIR bias unit according to the present invention.

FIG. 2 shows a wireless communication system 15 wherein the WTRU 100 also performs adaptive biasing using an adaptive SIR bias unit 60 and a summer 32. The adaptive SIR bias unit 60 generates a SIR bias that improves spectral efficiency by efficiently matching the transmitted modulation format and coding rate to the channel and receiver.

Figure 3:
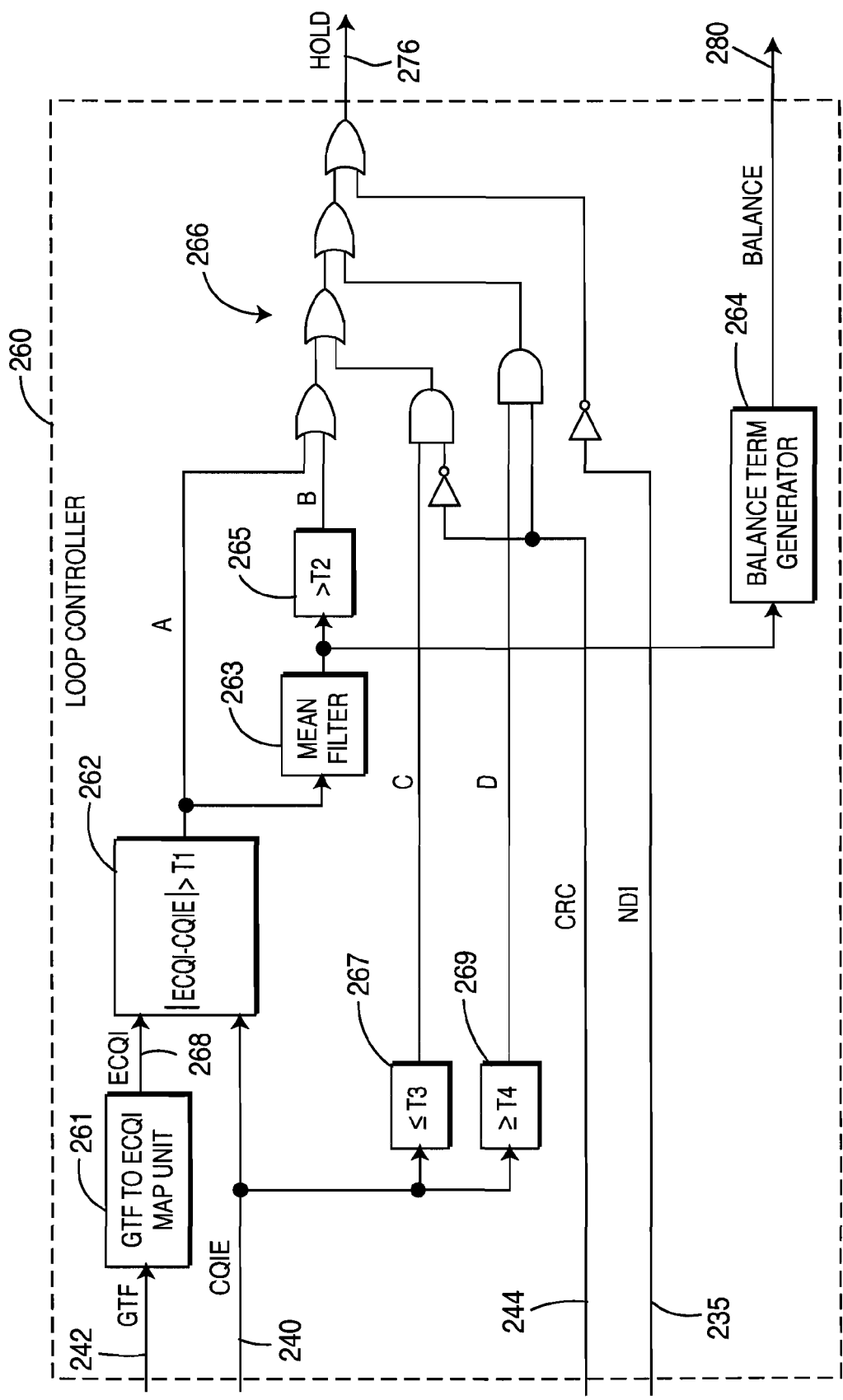
FIG. 3 is an exemplary block diagram of a loop controller used in the systems of FIGS. 1 and 2 to control the adaptive CQI biasing according to the present invention.

FIG. 3 is an exemplary block diagram of the loop controller 260. The loop controller 260 controls the overall operation of the adaptive correction term generator 250 via a hold signal 276. The BLER estimate at the base station 200 may be a conditional BLER, where the condition is that the transmission is the first, or an average BLER without conditions, (determined by the presence or absence of the NDI signal 235 shown in FIG. 3). The NDI signal 235 is obtained by interpretation of the transmitted NDI signal generated by the base station 200 and carried by the HS-SCCH channel. The base station generated NDI toggles between two states whenever new data is being transmitted, and therefore it is not used directly. Instead, the NDI is derived by checking if the state of the NDI has changed since the last time it was used for a given HARQ process. In the case of the WTRU 100, the NDI also needs to be decoded from the HS-SCCH channel reception.

The loop controller 260 receives a Channel Quality Indicator Expected (CQIE) value 240. The CQIE value is the CQI value that the WTRU 100 expected would be used for a given packet. It is a delayed version of the CQI reported.

The loop controller 260 also receives a Generated Transport Format (GTF) 242 and a CRC 244. The GTF is determined by the base station 200 as part of a scheduling algorithm. The CRC 244 is computed by the WTRU 100 as an indication of whether or not the transport block was received in error.

Figure 4:
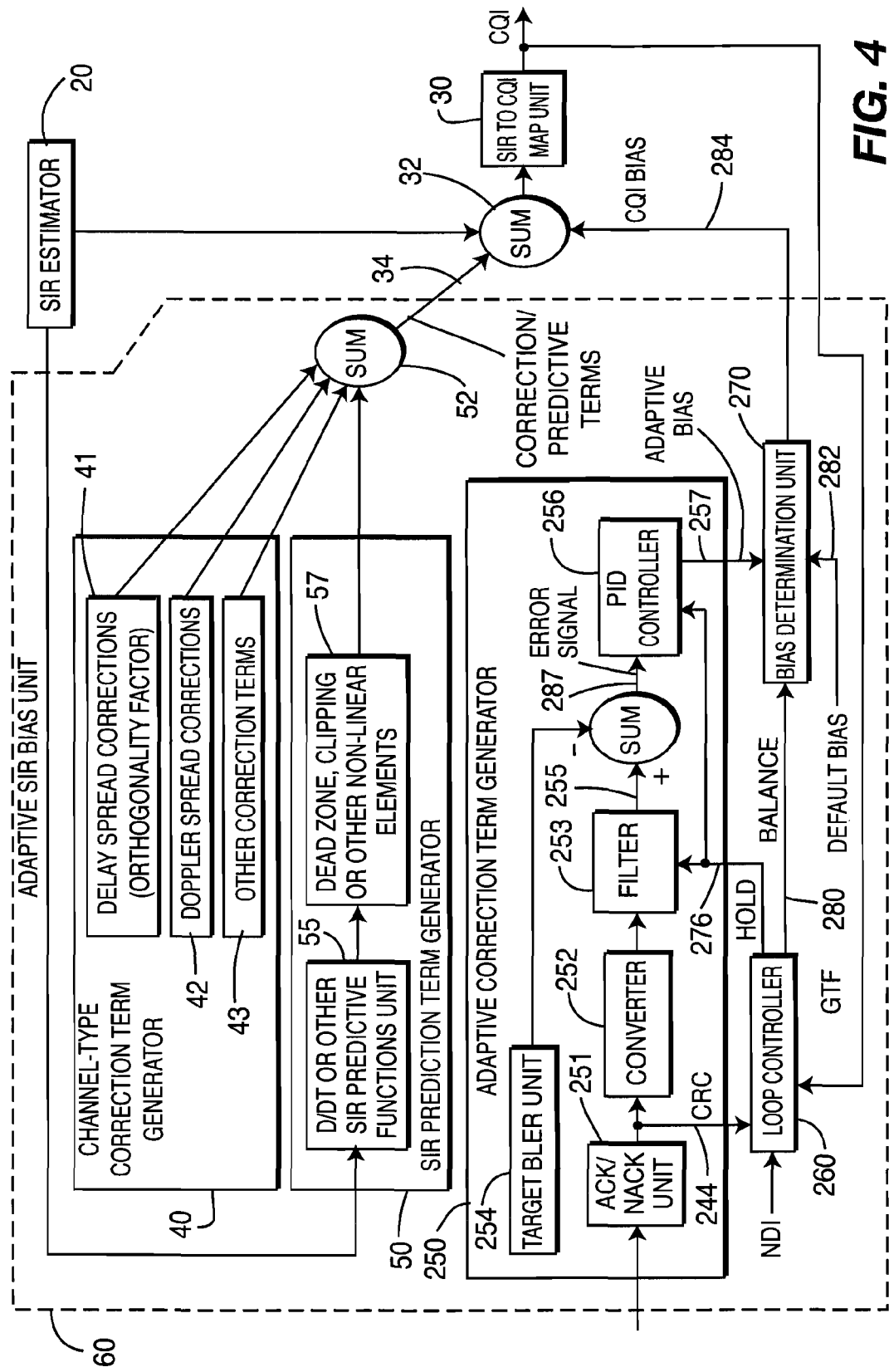
FIG. 4 is a detailed block diagram of an adaptive SIR bias unit used in the system of FIG. 2.

FIG. 4 is a detailed block diagram of the adaptive SIR bias unit 60 located within the WTRU 100 of the wireless communication system 15. The adaptive SIR bias unit 60 includes a channel-type correction term generator 40, a SIR prediction term generator 50, an adaptive correction term generator 250, a loop controller 260, a bias determination unit 270 and a summer 52.

As shown in FIG. 4, a subsystem including the adaptive correction term generator 250, loop controller 260 and bias determination unit 270 generates a CQI bias signal 284 which is input to an external summer 32 to bias the SIR that maps into CQI such that the WTRU 100 will achieve the target performance in terms of BLER.

The channel-type correction term generator 40 provides additional correction terms to the input of the summer 52 to bias the SIR estimate. These correction terms include delay spread corrections, (e.g., orthogonality factors), 41, Doppler spread corrections 42, and other correction terms 43, (e.g., battery voltage dependant losses introduced by the WTRU 100, other channel-type corrections, or the like). Since SIR alone does not completely define the quality of the channel, these corrections improve system performance. The correction terms may be used to adjust the SIR bias, the target BLER, or both.

The SIR prediction term generator 50 includes a derivative, (i.e., D/DT), for linear prediction or other SIR predictive functions unit 55 and dead zone, clipping or other non-linear elements 57 which provide predictive terms to the input of the summer 52 to bias the SIR estimate.

The SIR prediction term generator 50 may also be employed to improve the bias by estimating what the SIR will be at a time when the base station 200 will transmit the next packet. If the channel type is identified, e.g., as a high speed channel, then an open loop or feed forward prediction bias term may be introduced. By making use of a predicted SIR rather than a current SIR, CQI reports are more accurate at the time there are used. The adaptive bias method and apparatus described herein is compatible with these algorithms.

The channel-type correction term generator 40 and the SIR prediction term generator 50 may be used alone or in combination with each other or with the adaptive correction term generator 250 to generate an SIR correction. When both the correction terms provided by the channel-type correction term generator 40 and the predictive terms provided by the SIR prediction term generator 50 are provided to the summer 52, the summer 52 outputs a resulting composite correction/predictive term 34 to the external summer 32, where the correction/predictive terms 34 are summed with the output of the SIR estimator 20 and the CQI bias signal 284 to generate a corrected SIR.

The corrected SIR is mapped by the SIR to CQI map unit 30 to generate a CQI value. The CQI value is sent to the base station 200 along with an ACK or NACK as appropriate. The base station 200 may then bias the CQI value received from the WTRU 100 using the adaptive correction term generator 250, loop controller 260 and bias determination unit 270 as previously described. As a result, in this embodiment, biasing of the CQI value may be performed in the WTRU 100 and in the base station 200.

In an alternate embodiment, a unit similar to the adaptive SIR bias unit 60 may also be incorporated into the base station 200, in lieu of the adaptive correction term generator 250, which would perform CQI predictions, rather than SIR predictions.

FIG. 3 is an exemplary block diagram of the loop controller 260 which provides overall control of adaptive CQI biasing in the WTRU 100 and/or the base station 200 shown in FIG. 2.

The loop controller 260 includes a GTF to Equivalent Channel Quality Indicator (ECQI) map unit 261, first comparator 262, second comparator 265, third comparator 267, fourth comparator 269, a mean filter 263, a balance term generator 264, and a logic control circuit 266. The GTF 242, (i.e., TF), is mapped by a GTF-ECQI map unit 261 to generate an ECQI 268.

The ECQI 268 corresponds to the channel quality associated with the GTF 242. The first comparator 262 compares the difference between the ECQI 268 and the CQIE 240 to a threshold (T1).

The mean filter 263 produces a measurement proportional to the difference between the ECQI 268 and provides the measurement to the second comparator 265 and the balance term generator 264. The second comparator 265 compares the long term average to a threshold (T2).

The controller 266 generates a "hold" signal 276 having a binary value based on the respective outputs A, B, of the first and second comparators 262, 265, and the value of CQIE 240. If the absolute value of the difference between the CQIE 240 and the ECQI 268 exceeds T1, or if the long term average of the absolute difference between the CQIE 240 and the ECQI 268 exceeds T2, the controller 266 generates the hold signal 276.

The value of CQIE 240 also may affect the generation of the hold signal 276. If the CQIE 240 is determined by the comparator 267 to be less than or equal to a minimum value of CQI, (T3), and a NACK is sent from the WTRU 100 to the ACK/NACK unit 251 in the base station 200, the controller 266 generates the hold signal 276 based on output C of the comparator 267. If the CQIE 240 is determined by the comparator 269 to be greater than or equal to a maximum value of CQI, (T4), and an ACK is sent from the WTRU 100 to the ACK/NACK unit 251 in the base station 200, the controller 266 generates the hold signal 276 based on the output D of the comparator 269.

The hold signal 276 is not generated when the CQIE 240 is between T3 and T4, when NDI=TRUE, and the threshold tests performed by comparators 262 and 265 are not true.

A balance term generator 264 receives a measurement proportional to the difference between CQIE 240 and the ECQI 268, and generates a "balance value" signal 280. The balance value signal 280 is used by the bias determination unit 270 to form a weighted average of the adaptive bias 257 and a predetermined, (i.e., in the factory or by an operator), default bias term 282.

The hold signal 276 generated by the loop controller 260 suspends the operation of the adaptive correction term generator 250 by keeping the filter 253 and the PID controller 256 from updating. Thus, the bias determination unit 270 only produces a default bias term 282.

The bias determination unit 270 receives bias values, which include the adaptive bias 257, having a value AB, from the adaptive correction term generator 250, and a default bias 282, having a value DBT. The bias determination unit 270 receives a balance signal 280, having a value BAL, from the loop controller 260, and outputs a CQI bias signal 284 having a value BIAS according to Equation (1):

$$BIAS = BAL \times DBT + (1-BAL) \times AB \quad \text{Equation (1)}$$

The CQI sent from the WTRU 100 is biased based upon the corrected bias (BIAS) via the summer 210, as described above. The biased CQI is mapped by the CQI to TF map unit 220 to generate a TF 225 used for transmission. The CQI in 3GPP will span 0-30 in integer steps, but is somewhat arbitrary. The TF 225 is not a number but is, rather, a set of parameters, e.g., {packet size, number of codes, modulation type, transmit power}.

Figure 5:
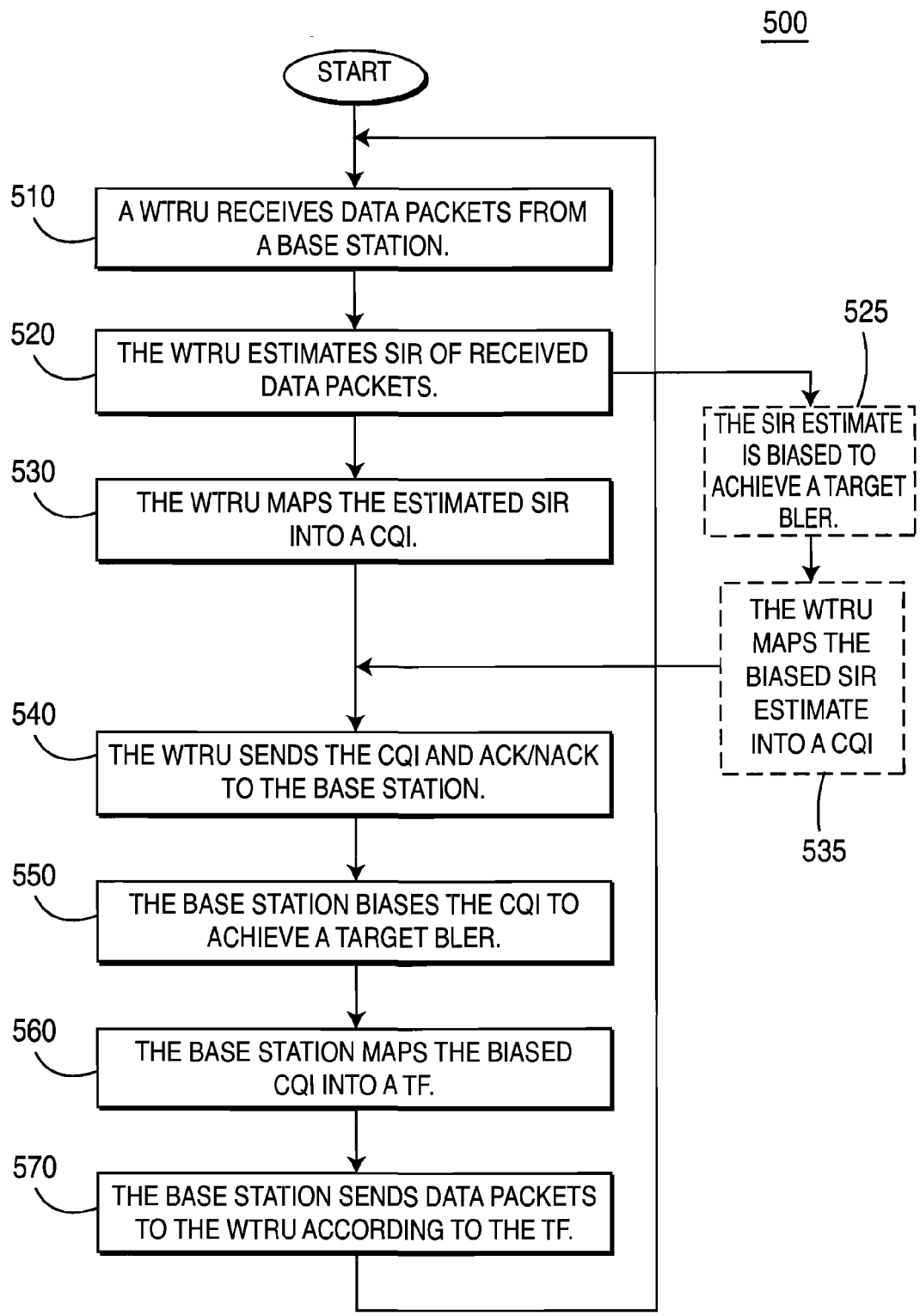
FIG. 5 is a flowchart of a process including method steps for managing communications using CQI biasing according to the present invention.

FIG. 5 is a flowchart of a process 500 including method steps for managing communications between the WTRU 100 and the base station 200 using CQI biasing according to the present invention. The receiver in the WTRU 100 receives data packets from the base station (step 510). The WTRU 100 estimates SIR of the received data packets (step 520) and maps the SIR onto a corresponding CQI via the SIR to CQI map unit 30 (step 530). As explained hereinbefore, if the WTRU 100 is implemented as the alternative embodiment of FIG. 2, the SIR is biased (optional step 525) prior to being mapped into the CQI (optional step 535). While receiving data packets, the WTRU 100 checks the packets for the presence of errors and sends an ACK or NACK as appropriate together with the CQI to the base station (step 540).

The base station biases the CQI received from the WTRU 100 to achieve a target BLER (step 550). The adaptive correction term generator 250 receives the ACK or NACK and calculates the BLER of the data packet. The number of packets used to determine the BLER, may be one or more packets and is determined by the filter 253. The adaptive correction term generator 250 then compares the BLER of the data packet to the target BLER and produces the adaptive bias signal 257. The adaptive bias 257 and a default bias 282 are combined in the bias determination unit 270 to produce the CQI bias 284 (BIAS) in accordance with the control of the loop controller 260.

The base station 200 then maps the CQI and the BIAS into a TF (step 560) through the CQI to TF map unit 220. The data packets are then transmitted according to the TF (step 570). By performing the above process repeatedly, the target BLER of the data packets sent can be obtained.

Although the features and elements of the present invention are described in the preferred embodiments in particular combinations, each feature or element can be used alone (without the other features and elements of the preferred embodiments) or in various combinations with or without other features and elements of the present invention.

While this invention has been particularly shown and described with reference to preferred embodiments, it will be understood by those skilled in the art that various changes in forms and details may be made therein without departing from the scope of the invention as described above.

What is claimed is:

1. A base station comprising:
   a transmitter configured to transmit data packets;
   an adaptive correction term generator configured to receive positive acknowledgement (ACK)/negative acknowledgement (NACK) messages associated with the data packets, and to produce an adaptive bias term based upon the ACK/NACK messages in order to achieve a target block error rate (BLER) of the data packets;
   a bias determination unit configured to receive the adaptive bias term from the adaptive correction term generator and provide a CQI bias signal;
   a summer configured to receive channel quality indicators (CQIs), and further configured to bias the CQIs based on the CQI bias signal;
   a CQI to transport format (TF) map unit configured to map the biased CQIs to TFs, wherein the transmitter transmits the data packets according to the TFs; and
   a loop controller, coupled to the bias determination unit and the adaptive correction term generator, for controlling an operation of the adaptive correction term generator by issuing a hold signal to suspend the operation of the adaptive correction term generator such that a predetermined default correction term is used instead of the adaptive bias term while the hold signal is asserted based upon at least one of a generated transport format (GTF) determined by the base station, a CQI expected (CQIE) value used for a given packet, an equivalent CQI (ECQI) corresponding to channel quality associated with the GTF, a new data indicator (NDI) determined by the transmitter, or a cyclic redundancy check (CRC) indication of whether or not a transport block was received in error.

2. The base station of claim 1 wherein the loop controller comprises:
   a map unit for mapping the GTF to the ECQI;
   a comparator, electrically coupled to the map unit, for comparing a threshold to an absolute value of a difference between the ECQI and the CQIE;
   a mean filter, electrically coupled to the comparator, for producing a long term average of the absolute value of the difference between the ECQI and the CQIE;
   a balance term generator, electrically coupled to the mean filter, for generating a balance signal based on the long term average produced by the mean filter, wherein the balance signal is provided to the bias determination unit; and
   a logic control circuit, electrically coupled to the comparator and the mean filter, for producing the hold signal which suspends the operation of the adaptive correction term generator.

3. The base station of claim 2 wherein the loop controller generates the hold signal to suspend the operation of the adaptive correction term generator on at least one of conditions:
   that the absolute value of the difference between the CQIE and the ECQI exceeds a first threshold,
   that the long term average of the absolute value of the difference between the CQIE and the ECQI exceeds a second threshold,
   that the CQIE is less than or equal to a minimum value of CQI and the CRC indication is a NACK, or
   that the CQIE is greater than or equal to a maximum value of CQI and the CRC indication is an ACK.

4. The base station of claim 1 wherein the adaptive correction term generator comprises:
   an ACK/NACK unit for receiving the ACK/NACK messages;
   a converter coupled to the ACK/NACK unit for mapping the ACK/NACK messages and calculating BLER of the data packets transmitted by the transmitter;
   a summer for comparing the BLER calculated by the converter to a target BLER and for producing an error signal based on the comparison; and
   a proportional integral derivative (PID) controller for producing an adaptive correction term based on the error signal.

5. The base station of claim 1 wherein the CRC indication is provided to the loop controller by the adaptive correction term generator.

6. The base station of claim 1 wherein the target BLER is set based on generated channel-type correction terms.

7. A base station comprising:
   a transmitter configured to transmit data packets;
   an adaptive correction term generator configured to receive positive acknowledgement (ACK)/negative acknowledgement (NACK) messages associated with the data packets, and to produce an adaptive bias term based upon the ACK/NACK messages in order to achieve a target block error rate (BLER) of the data packets;
   a bias determination unit configured to receive the adaptive bias term from the adaptive correction term generator and provide a CQI bias signal;
   a summer configured to receive a CQI, and further configured to bias the CQI based on the CQI bias signal; and a loop controller, electrically coupled to the adaptive correction term generator, for controlling an operation of the adaptive correction term generator by issuing a hold signal to suspend the operation of the adaptive correction term generator such that a predetermined default correction term is used instead of the adaptive bias term while the hold signal is asserted based on at least one of a generated transport format (GTF) determined by the base station, a CQI expected (CQIE) value used for a given packet, an equivalent CQI (ECQI) corresponding to channel quality associated with the GTF, a new data indicator (NDI) determined by the transmitter, or a cyclic redundancy check (CRC) indication of whether or not a transport block was received in error.

8. The base station of claim 7 further comprising:
a CQI to transport format (TF) map unit configured to map the biased CQI to a TF, wherein the transmitter transmits the data packets according to the TF.

9. The base station of claim 8 wherein the loop controller comprises:
a map unit for mapping the GTF to the ECQI;
a comparator, electrically coupled to the map unit, for comparing a threshold to an absolute value of a difference between the ECQI and the CQIE;
a mean filter, electrically coupled to the comparator, for producing a long term average of the absolute value of the difference between the ECQI and the CQIE;
a balance term generator, electrically coupled to the mean filter, for generating a balance signal based on the long term average produced by the mean filter, wherein the balance signal is provided to the bias determination unit; and
a logic control circuit, electrically coupled to the comparator and the mean filter, for producing the hold signal which suspends the operation of the adaptive correction term generator.

10. The base station of claim 9 wherein the loop controller generates the hold signal to suspend the operation of the adaptive correction term generator on at least one of conditions:
that the absolute value of the difference between the CQIE and the ECQI exceeds a first threshold,
that the long term average of the absolute value of the difference between the CQIE and the ECQI exceeds a second threshold,
that the CQIE is less than or equal to a minimum value of CQI and the CRC indication is a NACK, or
that the CQIE is greater than or equal to a maximum value of CQI and the CRC indication is an ACK.

* * * * *